United States Patent Office 2,791,238
Patented May 7, 1957

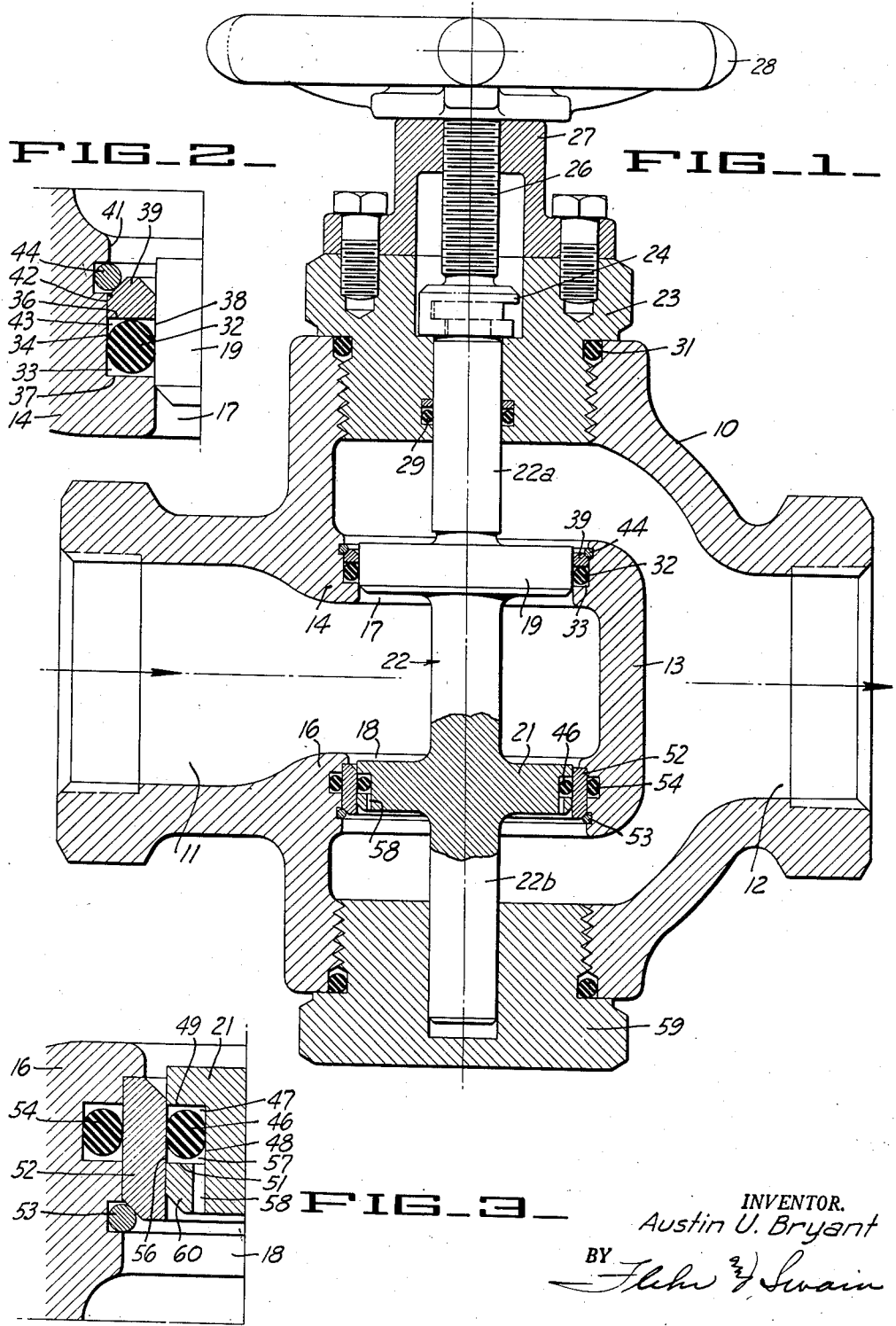

2,791,238
VALVE CONSTRUCTION

Austin U. Bryant, Berkeley, Calif., assignor, by mesne assignments, to Walworth Company, New York, N. Y., a corporation of Massachusetts Application May 19, 1952, Serial No. 288,668

1 Claim. (Cl. 137—625.34)

This invention relates generally to fluid flow control valves suitable for handling various fluids, including gases and liquids.

One type of valve that has been in common usage makes use of a bridge which separates the inflow and outflow passages, and which is provided with a pair of aligned ports. Two spaced valve elements are mounted on a common operating stem and are adapted to be moved between open and closed positions with respect to the valve ports. Valves of this type are sometimes referred to as double ported balanced valves. For all operating positions the valve is balanced with respect to the differential pressure between the inflow and outflow passages. Because of this balance feature such valves are well adapted for use with motor operating means, such as fluid pressure operated diaphragms or pistons. Also they provide relatively high flow capacity, due to the use of two ports or flow orifices which are connected in parallel between the inflow and outflow passages. A characteristic which is a disadvantage and which limits application of such valves, is that it is difficult to provide a fluid-tight seal between each of the two valve elements and the associated stationary valve seats. This is because the valve elements are located a fixed distance apart, which together with the fact that the valve seats are likewise fixed with respect to the body, makes it difficult to provide and maintain a proper seating pressure between each element and its associated seat. This applies particularly to constructions in which the valve working surfaces are formed on hard metal or metal alloy parts. Efforts to provide an adjustment between the valve elements have not been satisfactory because of undesirable mechanical complications, and because a critical adjustment can not be maintained over a long period of service.

It is an object of the present invention to provide a double ported balanced valve which provides a fluid-tight seal without the use of critical manufacturing technique, and without the use of adjustments.

Another object of the invention is to provide a valve of the above character with sealing means of the O ring type, and with provision for maintaining the resilient O rings within their accommodating recesses or grooves.

Further objects of the invention will appear from the following description in which the preferred embodiment has been set forth in detail in conjunction with the accompanying drawing.

Referring to the drawing.

Figure 1 is a side elevational view in section, illustrating a valve incorporating the present invention.

Figure 2 is an enlarged cross-sectional detail illustrating the sealing means associated with the uppermost one of the valve elements.

Figure 3 is a cross-sectional detail on an enlarged scale illustrating the construction of the sealing means associated with the lowermost one of the valve elements.

The valve illustrated in Figure 1 consists of a body 10 provided with the inflow and outflow passages 11 and 12.

The body is constructed to provide a barrier or bridge 13 which may be formed as a separate or as an integral part of the body as illustrated. The upper and lower portions 14 and 16 of the bridge are provided with the aligned ports 17 and 18. For open position of the valve these ports provide parallel communication between the inflow and outflow passages.

A pair of spaced valve elements 19 and 21 are associated with the ports 17 and 18, and are fixed to a common operating stem 22. These elements are substantially equal in diameter to prevent equal fluid pressure areas to the inflow pressure. The portion 22a of this stem extends through the bonnet closure 23, and can be attached by coupling 24 to the operating rod 26. Rod 26 can be threaded as illustrated, and has threaded engagement with the fitting or yoke 27. The outer end of rod 26 is shown attached to the operating hand wheel 28. Stem portion 22a is sealed with respect to the bonnet closure 23, by suitable means such as the resilient O ring 29. The bonnet closure is also sealed with respect to the body 10 with suitable means such as a gasket or the resilient O ring 31.

With the operating means described above it will be evident that upon turning the hand wheel 28 the threaded rod 26 is raised or lowered, thereby moving the stem 22 in the direction of its axis between opened and closed positions. Instead of such operating means it will be evident that the exterior end of the stem 22 can be attached to various devices, such as pneumatic or hydraulic pressure operated diaphragms, pistons and the like.

Sealing means of the O ring type is associated with each of the valve elements 19 and 21. The means associated with the element 19 (Fig. 2) consists of a resilient O ring 32 which is formed of suitable resilient material such as synthetic rubber or the like. This O ring is accommodated within an annular groove 33 which is formed in the bridge portion 14. The bottom of this groove is defined by surface 34, and the sides by the surfaces 36 and 37. The O ring is relatively loose between the surfaces 36 and 37, but it it slightly compressed between the surface 34 and the opposed surface 38 of the valve element 19. This compression of the O ring for closed position of the valve maintains a fluidtight seal between valve element 19 and the body.

The surface 36 is formed upon a metal ring 39, which is inserted into the body bore 41. The small clearance 42 between the outer periphery of ring 39 and adjacent peripheral surface of bore 41, establishes a pressure transmitting connection between the corner 43 of the groove 33 and the outflow side of the valve. Metal ring 39 can be held in place by suitable means such as the wire snap in ring 44.

The sealing means illustrated in Figure 3, which is associated with the lower valve element 21, makes use of a resilient O ring 46 that is accommodated in the annular recess or groove 47. This groove is formed in the periphery of the valve element 21 and is defined by the bottom surface 48, and the opposed side surfaces 49 and 51.

The body portion 16 is fitted with an insert ring 52, which is held in place by suitable means such as the removable snap in ring 53. The insert ring 52 is sealed with respect to the body by suitable means such as the resilient O ring 54. The resilient O ring 46 is normally squeezed or compressed a slight amount between the inner periphery 56 of the insert ring 52, and the surface 48 of the O ring accommodating groove. The corner 57 of the O ring accommodating groove has a pressure transmitting connection with the outflow passage, through one or more ducts 58.

As supplemental guide means of the valve member, the stem is shown provided with an extension 22b, which slidably fits within the closure plug 59. Thus both valve stem portions 22a and 22b serve to guide and maintain the valve elements in alignment with the bores 17 and 18.

The operation of my valve is as follows: For full closed position of the elements 17 and 18, illustrated in Fig. 1 and also in Fig. 2 and Fig. 3, the O ring 32 establishes a fluidtight seal between the bridge portion 14 and valve element 19, and the O ring 46 maintains a fluidtight seal between the bridge portion 16 and the lower valve element 21. Both valve elements 19 and 21 present equal fluid pressure areas to the inflow pressure, and therefore inflow pressure does not create force components tending to urge the valve elements toward open or closed positions. When the valve elements move toward open position they are raised from the position shown in Fig. 1, whereby the element 19 slides upwardly with respect to the O ring, 32, and the element 21, together with the O ring 46, slides upwardly with respect to the insert ring 52. After the initial part of such opening movement, a position is reached at which both the elements 19 and 21 separate from engagement with the O rings 32 and 46. Assuming that a substantial differential pressure is being applied to the valve, inflow pressure is applied to the O ring 32 in such a manner as to urge it into (i. e. toward) the corner 43. Note that differential forces are acting upon the O ring 32 at this time due to the fact that the corner 43 of the accommodating recess is in communication with the outflow (i. e. low pressure) side.

During the initial movement of the valve, the O ring 46 is raised to a point where it breaks sealing engagement with the inner periphery 56 of the insert 52. Since the corner 57 of the recess 47 is in pressure communication with the outflow side through the vent 58, the O ring 46 is likewise pressed against the surfaces 48 and 51, and generally in a direction to hold it within its accommodating recess. Some restricted flow likewise appears past the element 21, and between the outer periphery of the lip 60 and the inner periphery 56 of the insert ring 52.

Because of the manner in which rings 32 and 46 are held into their accommodating grooves, they do not tend to follow or cling to the elements 19 and 21, but effect a clean separation.

As one continues to move the valve toward open position, the valve element 19 reaches a position in which it commences to leave the proximity of the ring 39, to thereby provide increased flow through the port 17. Likewise the lip 60 of the lower valve element 21 commences to leave the proximity of the insert ring 52. As the valve member continues to move to full open position substantially equal cross sectional flow areas are provided through the ports 17 and 18 and about valve elements 19 and 21. The balanced relation previously mentioned is maintained for all operating positions.

It will be evident from the foregoing that I have provided a double ported balanced valve which is capable of maintaining a good fluidtight seal for closed position of the same. The seal maintained with respect to both the valve elements 19 and 21 is not critical with respect to the distance between the elements, nor is it critical with respect to the alignment of these elements with respect to the axis of the bores 17 and 18. The O ring sealing means employed in connection with the valve elements is so constructed that both O rings are securely held within their accommodating grooves by fluid pressure, thus preventing their dislodgement by differential fluid pressures, or by high velocity fluid flow which occurs when the valve is moved from full closed toward open position. My valve can be used on high pressure service, as for example pressures of the order of 1,000 to 3,000 p. s. i. or more.

I claim:

In a valve construction a body having an inflow and an outflow passage, a bridge formed within the body and providing first and second spaced bridge parts having aligned ports through the same, each port serving to communicate directly between said inflow and outflow passages for open position of the valve, corresponding first and second annular valve parts associated with said ports, said valve parts having cylindrical shaped outer peripheral surfaces, means serving to rigidly connect said valve parts together for conjoint movement of the same between open and closed positions relative to said ports, said valve parts presenting substantially equal fluid pressure areas to the inflow side of the valve, and having a spacing corresponding to the spacing between the bridge parts, an annular groove formed in one of said bridge parts, a resilient O-ring loosely accommodated in said groove, said O-ring adapted to engage and seal with respect to an annular surface formed on the other first valve part, the bottom corner of said groove nearest to the outflow side being in pressure communicating relationship with the outflow side of the valve, an annular groove formed in one of the valve parts, and a resilient O-ring loosely accommodated in said last named groove, said last named O-ring being adapted to have sealing engagement with an annular surface of the associated second bridge part for closed position of the valve, an insert ring removably carried by the second bridge part, said insert ring being sealed with respect to the second bridge part and having an inner periphery that forms the last named annular surface, the bottom corner of the last named groove nearest to the outflow side being in pressure communicating relationship with said outflow side, both said valve parts being movable simultaneously between sealed closed and full open positions.

References Cited in the file of this patent

UNITED STATES PATENTS

| | | |
|---|---|---|
| 176,204 | Shive | Apr. 18, 1876 |
| 1,320,944 | Thoens | Nov. 4, 1919 |
| 2,223,509 | Brauer | Dec. 3, 1940 |
| 2,481,482 | Green | Sept. 13, 1949 |
| 2,574,054 | Miller | Nov. 6, 1951 |
| 2,713,989 | Bryant | July 26, 1955 |

FOREIGN PATENTS

| | | |
|---|---|---|
| 1,477 | Great Britain | of 1886 |
| 532,590 | Germany | of 1931 |
| 177,010 | Switzerland | of 1935 |
| 615,974 | Great Britain | of 1949 |